United States Patent
Stewart, II

(10) Patent No.: US 7,001,030 B2
(45) Date of Patent: Feb. 21, 2006

(54) SYSTEM, METHOD, AND APPARATUS FOR IMPROVING THE STEALTH CAPABILITY OF AN OPTICAL INSTRUMENT

(75) Inventor: William L. Stewart, II, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/809,208

(22) Filed: Mar. 25, 2004

(65) Prior Publication Data

US 2005/0213217 A1    Sep. 29, 2005

(51) Int. Cl.
  *G02B 23/00* (2006.01)

(52) U.S. Cl. ........................................... 359/614
(58) Field of Classification Search ......... 359/601–615
  See application file for complete search history.

(56) References Cited

U.S. PATENT DOCUMENTS

| | | | |
|---|---|---|---|
| 1,782,288 A | | 11/1930 | Cluff ........................ 422/198 |
| 3,192,632 A | * | 7/1965 | Von Stavenhagen ......... 42/144 |
| 3,619,040 A | | 11/1971 | Rickets ...................... 350/286 |
| 3,672,782 A | * | 6/1972 | Akin, Jr. .................... 356/251 |
| 3,711,185 A | | 1/1973 | McKinley .................. 350/201 |
| 3,902,251 A | * | 9/1975 | Ross ........................... 42/122 |
| 4,150,191 A | * | 4/1979 | Karki .......................... 428/454 |
| 5,093,837 A | | 3/1992 | Edwards ..................... 372/103 |
| 5,121,251 A | | 6/1992 | Edwards ..................... 359/368 |
| 5,268,788 A | | 12/1993 | Fox et al. .................... 359/490 |
| 5,373,644 A | * | 12/1994 | DePaoli ........................ 42/113 |
| 5,629,492 A | | 5/1997 | Gleason ..................... 89/41.19 |
| 5,745,292 A | | 4/1998 | Jones ......................... 359/613 |
| 6,028,691 A | | 2/2000 | Doster ........................ 359/234 |
| 6,488,381 B1 | * | 12/2002 | Morgan, III ................ 359/611 |
| 2002/0039236 A1 | | 4/2002 | Jones .......................... 359/601 |

* cited by examiner

*Primary Examiner*—Drew A. Dunn
*Assistant Examiner*—Mark Consilvio
(74) *Attorney, Agent, or Firm*—Bracewell & Giuliani LLP

(57) ABSTRACT

A tube-mounted inclined optical flat for improving the stealth capability of an optical aperture is disclosed. The optical flat has a light-absorbing finish on its rear surface, and is mounted in front of existing instrument optics. The light from the scene being viewed passes through the optical flat and is undistorted. Any light that is reflected from the optical flat is absorbed by the light-absorbing tube. Light that enters the distal end of tube is absorbed in the same manner. Any light entering the instrument optics from the observer's end and internal reflected light emanate from within the optics. Much of this light is absorbed by the rear finish on the optical flat. Selection of the optics' virtual focal points and placement of the optical flat relative to the optics reduce the size requirement of the rear finish on the optical flat.

26 Claims, 3 Drawing Sheets

SYSTEM, METHOD, AND APPARATUS FOR IMPROVING THE STEALTH CAPABILITY OF AN OPTICAL INSTRUMENT

BACKGROUND OF THE INVENTION

1. Technical Field

The present invention relates in general to improving the stealth capability of an optical instrument and, in particular, to an improved system, method, and apparatus for improving the stealth capability of an optical instrument.

2. Description of the Related Art

Optical devices often contain one or more lenses or other reflective surfaces. For example, optical devices for ranging, guidance, communication or information gathering, such as binoculars, telescopes, periscopes, rifle scopes and the like, all contain one or more lenses that can reflect incident light. Laser beam detection devices have found increased use in locating and/or ranging functions, particularly in military applications, and rely on analysis of reflected beams to detect and/or determine the position of an apparatus that contains a reflective surface, for example such optical devices as mentioned above. For example, a scanning laser may be projected across a combat area to determine an enemy's location. Reflected laser beams from a reflective surface of an optical device can be analyzed to determine the presence and location of the source of reflection.

Such scanning as well as targeting, ranging, designating and offensive lasers are capable of causing eye injury and, as a safety measure, soldiers and others who might be exposed to such beams frequently include dielectric or other filters in optical devices to prevent transmissions of harmful light to the eye. For example, laser protective filters have been incorporated into optical devices used in military settings, such as armored vehicle sights, binoculars and the like. The protective filters are often positioned behind one or more optical elements, e.g., behind one or more transparent or translucent lenses. Alternatively, the protective filters may be positioned in front of an optical device, such as in front of the outermost lens element of the device. In particular, to retrofit optical devices such as a scope to include a laser protective filter, often the only cost effective or practical place to put the filter is in front of the device.

While such laser protective filters can effectively block transmission of harmful electromagnetic radiation, the filters are typically highly reflective and thus can produce reflections of incident light, such as light of the dome of the sky, the sun or a scanning laser beam that can be readily detected by a viewer. As used herein, the term viewer refers to both a person and/or an apparatus for detecting such items. Moreover, a protective filter positioned in the front of an optical device, such as in the case of a retrofitted device, is particularly prone to produce reflections that can be readily discerned by a viewer.

In military situations, reflections from certain sensors that are part of optical systems also can be a problem. These sensors, such as charged coupled devices in video cameras, are typically reflective surfaces, and thus can generate retro-reflections back through the optical system, much in the way that at night, reflections of light from a car's headlights can be seen from a cat's retina. Such retro-reflections from a sensor element can be a serious problem, particularly in military situations. Systems are employed that scan a battlefield with a laser looking for retro-reflections such as from sensor elements located at the focal plane or other reflective surfaces within an optical system such as thermal sights and armor vehicle sights. The laser scanning systems use these retro-reflections from such optical devices to locate, identify and/or target the optical devices for offensive fire.

There are other instances where it is also very undesirable to have light reflected from an observing instrument returned to an object or scene being imaged or viewed. For example, in some chemistry experiments involving chemo-luminescence, a chemical reaction results in the production of light, and the quantity or time-rate of production of this light may provide an indication of the rate of the chemical reaction.

Another example is provided by particle physics in which the light produced by particle interactions with one another or with an indicator medium is of importance in detecting the fact of or the nature of such particle interactions, or their path in a magnetic or electric field, for example. In such cases, and others, the reflection of light from an optical observation instrument back into the scene being viewed or back to an object being viewed can be very detrimental. Thus, an improved system, method, and apparatus for improving the stealth capability of an optical instrument would be desirable.

SUMMARY OF THE INVENTION

One embodiment of a system, method, and apparatus for improving the stealth capability of an optical aperture utilizes an inclined optical flat that is mounted in a tube. The optical flat has an oval, light-absorbing finish or coating on a central portion of its rear surface, and is mounted in front of existing instrument optics. Most of the light from the scene being viewed passes through the optical flat and is undistorted. Any light that is reflected from the optical flat is absorbed by the inner surface of the light-absorbing tube. Light that enters the distal end of tube is absorbed in the same manner. The light from the scene is slightly reduced by the rear finish before it passes on through the instrument optics to the observer or detector.

Any light entering the instrument optics from the observer's (i.e., proximal) end and light that is reflected from the various surfaces within the instrument optics emanate from virtual focal points (VFP) within the optics. Much of this light is absorbed by the rear finish on the optical flat. Careful consideration of the VFP's and the placement of the optical flat relative to the instrument optics reduce the size requirement of the rear finish on the optical flat. As a result, light reflecting from the optical flat and much of the light returning from the instrument optics is absorbed by the rear finish within the stealth tube, thereby rendering the glint from the instrument optics undetectable. The presence and location of the instrument is not revealed to other observers and/or instruments.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
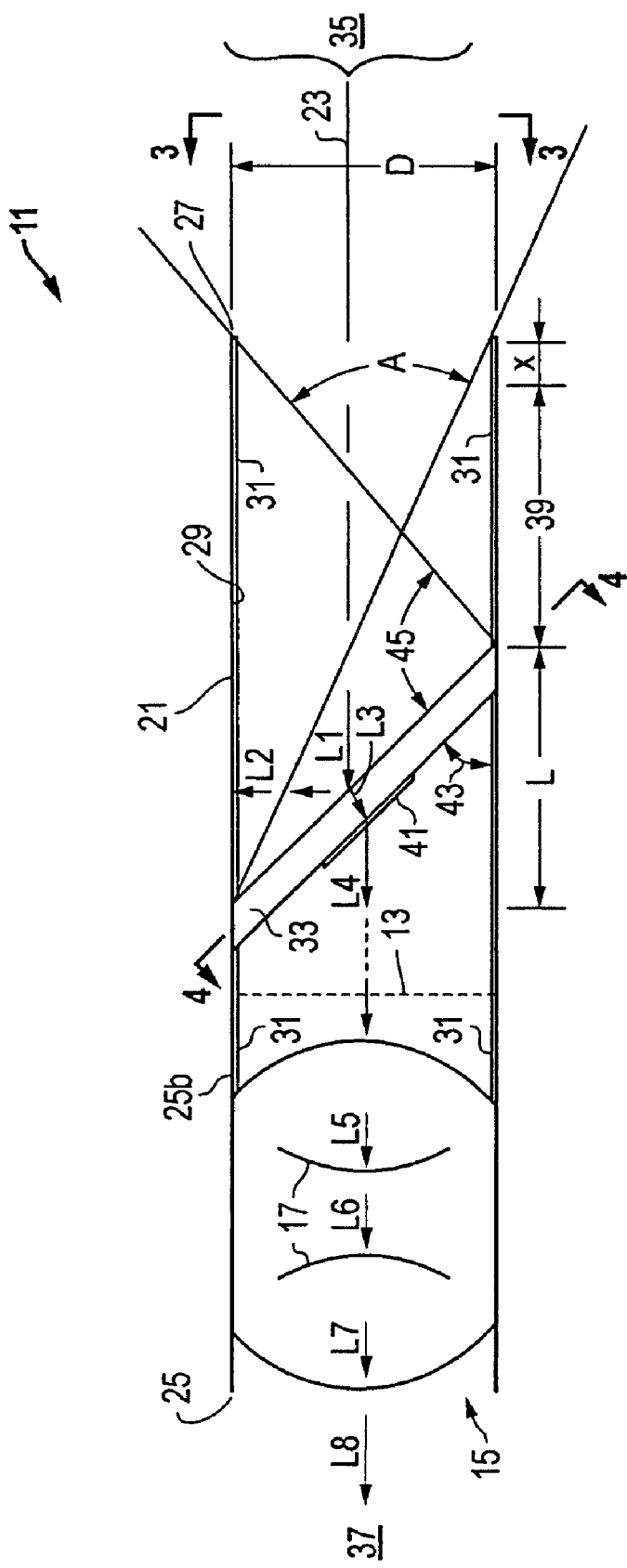
FIG. 1 is a sectional side view of one embodiment of an optical aperture constructed in accordance with the present invention and illustrating light entering the aperture from the scene.
Figure 2:
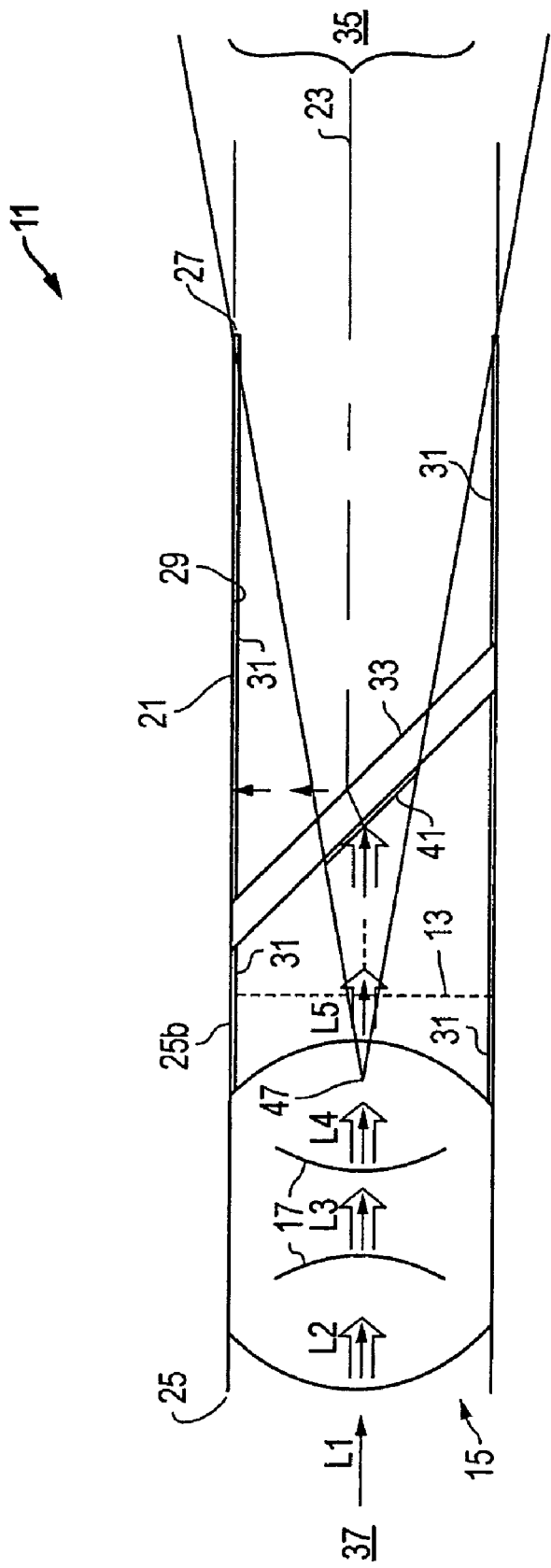
FIG. 2 is a sectional side view of the optical aperture of FIG. 1 illustrating light entering the observing end and/or light that is reflected by the optics.

Referring to FIGS. 1 and 2, one embodiment of a system, method, and apparatus for improving the stealth capability of an optical instrument is disclosed. Although the present invention is illustrated as a single, integrated device 11 for accomplishing the stated purpose, the present invention is readily configured as an auxiliary component (e.g., an attachment) for existing optical instruments, and/or may be used to incorporate other optical instruments, depending on the application. For example, the dashed vertical line 13 in FIGS. 1 and 2 represents one possible division between the optical instrument 15 (i.e., to the left of line 13) and the present invention (i.e., to the right of line 13), if they were to be configured separately. The optical instrument 15 itself may comprise one or more lenses 17 (e.g., two convex lenses are shown), such as is commonly known in the art.

In the embodiment shown, the optical device 11 comprises a round or cylindrical tube 21 having an axis 23, a proximal end 25, a distal end 27, and an inner surface 29. Again, the optical instrument 15 may or may not be part of the optical device 11, such that it is not located inside the tube 21 (see, e.g., proximal end 25b). A light-absorbing treatment 31 (for clarity, shown greatly exaggerated in thickness) is located on at least a portion of the inner surface 29 of the tube 21. In the embodiment shown, the light-absorbing treatment 31 comprises flat black and is located both in front of (to the right) and behind (to the left) of the optical flat 33. However, the light-absorbing treatment 31 may comprise many other forms, including a coating, a plating, a surface treatment, grating, powder, etc. Moreover, the light-absorbing treatment 31 may be formed on the entire inner surface 29, or on fewer portions than those illustrated, depending upon the application.

Although the light-absorbing treatment 31 is designed to absorb light, no object "perfectly" absorbs light. Thus, as used herein, "light-absorbing," "absorbed," etc., means, at the very least, a reduction in reflected light and, in many cases, a very substantial reduction in the amount of light reflected. In addition, the "light" may comprise visible light, ultraviolet (UV) light, infrared (IR) light, and/or still other forms of "light," depending on the application.

In the embodiment shown, the optical instrument 15 is mounted inside the tube 21 adjacent to the proximal end 25 of the tube 21. The optical instrument 15 is designed and adapted to magnify a distant object ("scene light" 35 in FIG. 1) for observation by a user and/or detector 37 located proximal to the optical instrument 15, as is commonly known in the art.

The optical flat 33 of the present invention is mounted inside the tube 21 between the optical instrument 15 and the distal end 27 of the tube 21. The optical flat 33 is mounted at an inclined proximal angle 43 (approximately 45 degrees, in one embodiment) relative to the tube 21 and a proximal surface of the optical flat 33. A distal angle 45 (preferably in excess of 90 degrees) is defined between a distal surface of the optical flat 33 and the tube 21.

Figure 3:
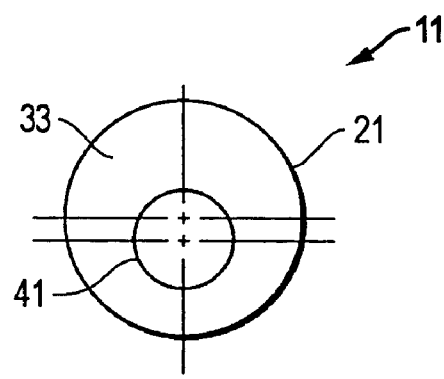
FIG. 3 is an end view of an optical flat of the optical aperture of FIG. 1.

Since the tube 21 is cylindrical in the embodiment shown, the optical flat 33 is elliptical in shape. However, from an end view perspective (FIG. 3), the optical flat 33 appears circular. The optical flat 33 completely circumscribes the entire inner surface 29 of the tube 21. Thus, all light that reaches the optical instrument 15 from the distal end 27 of the tube 21 passes through the optical flat 33. The optical flat 33 is preferably transparent, has parallel proximal and distal surfaces, and has a smoothness or flatness that meets optical commercial laboratory standards. For example, the smoothness and parallel nature of the surfaces of the flat 33 vary by no more than approximately one-fourth of a wavelength of the light passing therethrough. However, the optical flat should be as thin as possible for the application, but rugged enough for the application.

The material of the optical flat 33 (e.g., glass) has high transmittivity for the light being transmitted, whether UV, IR, visible, or still other forms of light. Moreover, the present invention is also applicable to any other forms of electromagnetic radiation in the electromagnetic spectrum. An axial distance 39 from the distal end 27 of the tube 21 to a nearest portion of the optical flat 33 is greater than a diameter of the tube 21. The tube is completely unobstructed from the optical flat 33 forward to beyond the distal end 27 of the tube 21. In other words, nothing obstructs the light entering the tube 21, such as in the case of prior art louver-type devices.

The optical flat 33 has a light-absorbing element 41 or optical aperture (for clarity, shown greatly exaggerated in thickness), mounted thereto for reducing light emitted from the tube 21 (i.e., to the right). Like the optical flat 33, the light-absorbing element 41 is generally oval (although is appears circular in the end view of FIG. 3). The optical flat 33 and element 41 may be other shapes as well, including, for example, elliptical, ovate, etc. In one embodiment, the light-absorbing element 41 is mounted on the proximal surface of the optical flat 33 as shown, and is slightly beneath the center of the optical flat 33. The light-absorbing element 41 is opaque to reduce and prevent reflection of light out the distal end 27 of the tube 21. The light 35 from the scene is slightly reduced by the light-absorbing element 41 before it passes on through the optical instrument 15 to the observer or detector 37.

Any light 35 that enters the tube 21 from the distal end 27 that is reflected by the optical flat 33 is absorbed by the light-absorbing treatment 31 on the inner surface 29 of the tube 21. Any light 37 entering the optical instrument 15 from the proximal end 25 of the tube 21 (see, e.g., FIG. 4) and light that is reflected from surfaces within the optical instrument 15 (e.g., from the surfaces of lenses 17) emanate from virtual focal points, or VFP, (see, e.g., VFP 47) within the optical instrument 15, and is absorbed by the light-absorbing element 41, as shown in FIG. 2.

As alluded to above, the present convention also comprises a method of improving a stealth capability of an optical device. One embodiment of the method comprises providing an optical instrument 15 and a tube 21 with an optical flat 33, placing a light-absorbing treatment 31 on an inner surface 29 of the tube 21 and a light-absorbing element 41 on the optical flat 33, passing light from a scene through a distal end 27 of the tube 21, the optical flat 33, and the optical instrument 15, absorbing light entering the distal end 27 with the light-absorbing treatment 31, and absorbing light reflected by the optical instrument 15 with the light-absorbing element such that light emitted from the tube 21 is reduced.

Figure 4:
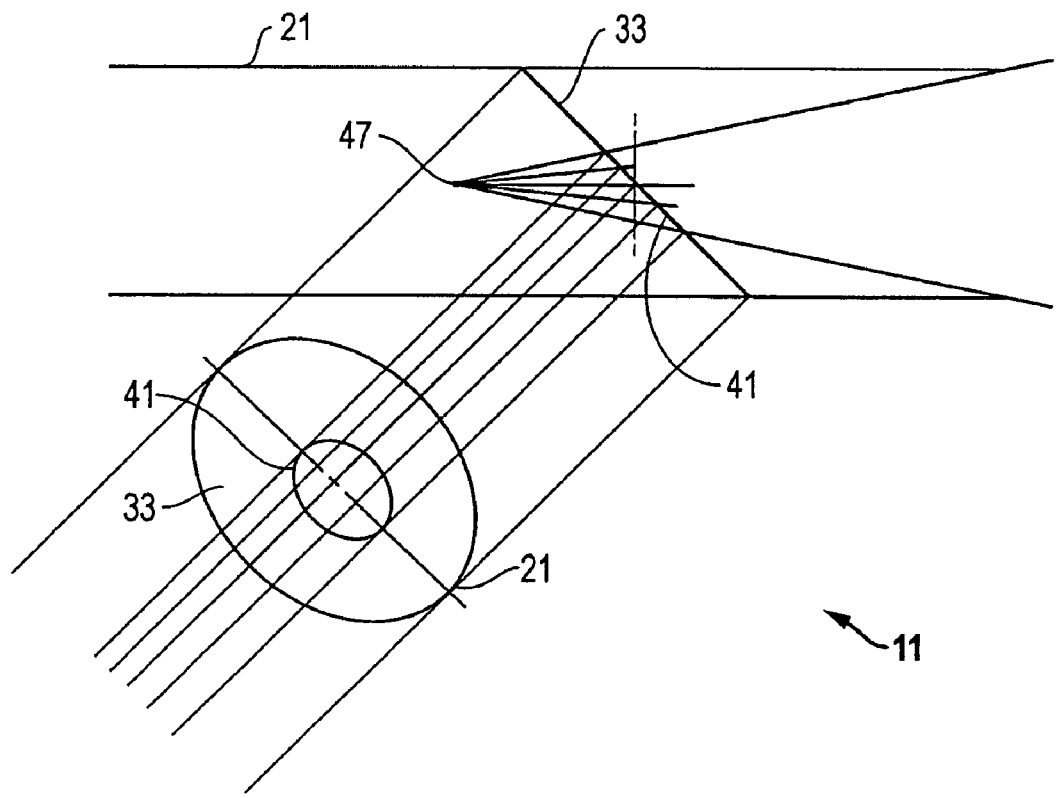
FIG. 4 is a plan view of the optical flat of FIG. 3.

The method may further comprise absorbing light entering a proximal end 25 of the tube 21, and/or absorbing visible, UV, and/or IR light, depending on the application. In addition, the optical flat 33 and the light-absorbing element 41 may be provided in oval shapes, and the optical flat 33 oriented at an inclined angle 43 relative to the tube 21. The method may further comprise passing all light that reaches the optical instrument 15 from the distal end 27 of the tube 21 through the optical flat 33. The light-absorbing element 41 may be mounted on a proximal surface of the optical flat 33 as dictated by the intersection of a cone and a plane (FIG. 4). For example, the element 41 may be slightly off-center with respect to the optical flat 33, depending on the virtual focal point (of the optical instrument 15) from which the cone is projected.

The method may further comprise absorbing any light that enters the tube 21 from the distal end 27 that is reflected by the optical flat 33 with the light-absorbing treatment 31 on the inner surface 29 of the tube 21. The optical flat may be provided as transparent with parallel surfaces, and a smoothness or flatness that varies no more than approximately one-fourth of a wavelength of the light passing therethrough. In addition, the method may further comprise unobstructing the distal end 27 of the tube 21 from the optical flat 33 forward to beyond the distal end 27 of the tube 21.

The present invention has several advantages, including the ability to improve the stealth capability of an optical aperture. Almost all light moving toward or away from the interior of the device is absorbed by the rear finish on the optical flat and/or by the interior finish of the tube. This design renders the glint from the instrument optics virtually undetectable, and thereby avoids revelation of the presence and location of the instrument to other observers and/or instruments.

While the invention has been shown or described in only some of its forms, it should be apparent to those skilled in the art that it is not so limited, but is susceptible to various changes without departing from the scope of the invention.

What is claimed is:

1. An optical device, comprising:
    a tube having an axis, a proximal end, a distal end, and an inner surface;
    a light-absorbing treatment on at least a portion of the inner surface of the tube;
    an optical instrument mounted inside the tube;
    an optical flat mounted inside the tube between the optical instrument and the distal end of the tube, the optical flat having a light-absorbing element mounted thereto for reducing light emitted from the tube; and
    wherein the light-absorbing element is a coating mounted on a proximal surface at a central portion of the optical flat, and wherein the proximal surface of the optical flat has an annular uncoated portion surrounding the coated light-absorbing element at the central portion.

2. The optical device of claim 1, wherein the light-absorbing treatment and the light-absorbing element absorb visible, UV, IR light, and other forms of electromagnetic radiation.

3. The optical device of claim 1, wherein the optical flat is mounted at an inclined angle relative to the tube.

4. The optical device of claim 1, wherein the optical flat is elliptical and all light that reaches the optical instrument from the distal end of the tube passes through the optical flat.

5. The optical device of claim 1, wherein any light that enters the tube from the distal end that is reflected by the optical flat is absorbed by the light-absorbing treatment on the inner surface of the tube.

6. The optical device of claim 1, wherein the optical flat is transparent, has parallel surfaces, and has a smoothness that varies no more than approximately one-fourth of a wavelength of the light passing therethrough.

7. The optical device of claim 1, wherein any light entering the optical instrument from the proximal end of the tube and light that is reflected from surfaces within the optical instrument emanate from virtual focal points within the optical instrument; and wherein
    said any light is absorbed by the light-absorbing element.

8. The optical device of claim 1, wherein an axial distance from the distal end of the tube to a nearest portion of the optical flat is greater than a diameter of the tube.

9. The optical device of claim 1, wherein the optical instrument is mounted adjacent to the proximal end of the tube and magnifies a distant object for observation.

10. An attachment for an optical instrument, comprising:
    a tube having an axis, a proximal end, a distal end, and an inner surface;
    a light-absorbing treatment on at least a portion of the inner surface of the tube; and
    a planar inclined optical flat mounted inside the tube between the proximal and distal ends, wherein the tube is free of light-transmissive instruments from the optical flat to the distal end of the tube, the optical flat having a light absorbing element mounted thereto for reducing light emitted from the distal end of the tube.

11. The attachment of claim 10, wherein the light-absorbing treatment and the light-absorbing element absorb visible, UV, IR light, and other forms of electromagnetic radiation.

12. The attachment of claim 10, wherein the optical flat is mounted at an inclined angle relative to the tube.

13. The attachment of claim 10, wherein the light-absorbing element is oval and opaque, and is slightly off center with respect to the optical flat.

14. The attachment of claim 10, wherein the light-absorbing element is a coating mounted on a proximal surface at a central portion of the optical flat, and wherein the proximal surface of the optical flat has an annular uncoated portion surrounding the coated light-absorbing element at the central portion.

15. The attachment of claim 10, wherein any light that enters the tube from the distal end that is reflected by the optical flat is absorbed by the light-absorbing treatment on the inner surface of the tube.

16. The attachment of claim 10, wherein the optical flat is transparent, has parallel surfaces, and has a smoothness that varies no more than approximately one-fourth of a wavelength of the light passing therethrough.

17. The attachment of claim 10, wherein any light entering the proximal end of the tube is absorbed by the light-absorbing element.

18. The attachment of claim 10, wherein an axial distance from the distal end of the tube to a nearest portion of the optical flat is greater than a diameter of the tube.

19. A method of improving a stealth capability of an optical device, comprising:
    (a) providing a tube having therein an optical instrument and an optical flat, wherein the tube includes an optical instrument on a proximal side of the optical flat, and wherein the tube is free of light-transmissive instruments on a distal side of the optical flat from the optical flat to a distal end of the tube, (b) placing a light-absorbing treatment on an inner surface of the tube and a light-absorbing element on the optical flat;

(c) passing light from a scene through a distal end of the tube, the optical flat, and the optical instrument;

(d) absorbing light entering the distal end with the light-absorbing treatment; and (e) absorbing light reflected by the optical instrument with the light-absorbing element such that light emitted from the tube is reduced.

20. The method of claim 19, wherein step (e) further comprises absorbing light entering a proximal end of the tube.

21. The method of claim 19, wherein steps (d) and (e) comprise absorbing visible, UV, IR light, and other forms of electromagnetic radiation.

22. The method of claim 19, further comprising providing the optical flat and the light-absorbing element in oval shapes, and orienting the optical flat at an inclined angle relative to the tube.

23. The method of claim 19, further comprising passing all light that reaches the optical instrument from the distal end of the tube through the optical flat.

24. The method of claim 19, wherein the light-absorbing element is a coating mounted on a proximal surface at a central portion of the optical flat, and wherein the proximal surface of the optical flat has an annular uncoated portion surrounding the coated light-absorbing element at the central portion.

25. The method of claim 19, wherein step (d) further comprises absorbing any light that enters the tube from the distal end that is reflected by the optical flat with the light-absorbing treatment on the inner surface of the tube.

26. The method of claim 19, wherein the optical flat is transparent, has parallel surfaces, and has a smoothness that varies no more than approximately one-fourth of a wavelength of the light passing therethrough.

* * * * *